Sept. 20, 1932.  E. LIESE  1,878,940
DECOMPOSITION OF WAXES
Filed Jan. 5, 1929
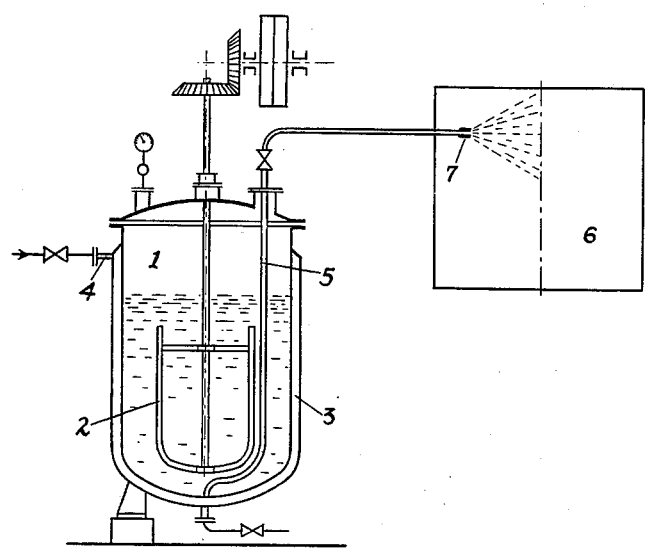
INVENTOR:
Erwin Liese,
BY
ATTORNEYS.

Patented Sept. 20, 1932

1,878,940

UNITED STATES PATENT OFFICE

ERWIN LIESE, OF LEVERKUSEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

DECOMPOSITION OF WAXES

Application filed January 5, 1929, Serial No. 330,624, and in Germany January 14, 1928.

The present invention relates to the decomposition of waxes.

Waxes of any origin, such as animal, vegetable and mineral waxes, for example, beeswax, wool fat, carnauba wax, Montan wax, and the like, are mixtures of esters of high molecular acids and high molecular alcohols with free acids, free alcohols and hydrocarbons. The decomposition of waxes into the acids on the one hand, and the mixture of alcohols and hydrocarbons, on the other hand, (the unsaponifiable portion) is achieved first of all by saponification, whereby a mixture of the metallic salts of the acids, the soaps and the unsaponifiable portion is produced. The mixture is separated by removing the unsaponifiable portion from the soaps by means of a solvent. For this purpose, the product of the saponification must be brought into a form suitable for extraction, that is to say, it must be dried and powdered. Even for small quantities, such as are necessary for analytical purposes, this object is rather troublesome to attain. The difficulties increase considerably when it becomes a question of working up larger quantities on a technical scale. The reason for this lies in the characteristic soft plasticity of the saponified waxes, which absorb and retain tenaciously the water or other liquids, such as alcohol, originating from the saponification process. The drying and powdering cannot be carried out with the desired success when working according to the customary methods. In the damp or insufficiently powdered form, however, the saponified waxes yield on extraction impure products in insufficient yield.

In accordance with the present invention the waxes, saponified in the usual manner with caustic alkali, are brought into a form suitable for extraction purposes by spraying the hot saponification product, whereby the water or solvent evaporates, and a finely divided powder is obtained. My new process may be carried out favorably, for example, by saponifying the wax, such as wool fat, in an autoclave with a sufficient quantity of alkali lye at an elevated temperature and at an elevated pressure. When the saponification is complete the content of the autoclave is blown with the aid of the pressure present in the autoclave or of a pressure produced by forcing in a suitable gas or steam through a pipe into a receiver, said pipe terminating in a nozzle. Thereby the mass is sprayed and the water present due to the heat evaporates, a finely divided loose powder being produced. This powder no longer possesses the soft, sticky or gum like properties of the damp wax soaps and no longer tends to bake together. It constitutes a product of ideal properties for extraction purposes, since even in thick layers it is readily penetrated by solvents and can be completely extracted.

A suitable apparatus for carrying out such a process is shown in the annexed drawing. In this drawing, 1) represents an autoclave; 2) a stirrer arranged therein; 3) a heating jacket; 4) means for supplying the heating jacket with steam; 5) a pipe for removing the saponification mixture entering the receiver 6) with a nozzle 7).

Furthermore auxiliary substances can be added to the product before or after saponification in order to cause, if necessary, a still finer disintegration of the saponified product during the spraying, such substances being, for example, sodium sulfate, kieselguhr, charcoal sawdust, pumice powder and the like. The saponification can, of course, be effected with other metallic oxides and hydroxides, especially those of the alkaline earth metals either in aqueous alcoholic solution or suspension. Likewise the spraying and drying process can, when required, be assisted by the action on the product to be sprayed, of hot gases or vapors, such as air, nitrogen, carbon dioxide or super-heated steam. Moreover the spraying can be carried out in a chamber at a pressure below that of the atmosphere. In order to favor the evaporation of the solvent, the mixture of soaps, alcohols and hydrocarbons as obtained by splitting-up waxes may be sprayed into a vacuum receiver, or a stream of a hot inert gas, such as air or carbondioxide may be passed through said receiver.

The following examples will illustrate my invention, without limiting it thereto:

*Example 1*

11.8 kgs. of yellow beeswax, (saponification number 95) were heated in a stirring autoclave for 8 hours at 175° C. and 8 atmospheres pressure with 4 kgs. of caustic soda solution (23.5% NaOH). The whole content of the autoclave was blown out through a nozzle into a chamber. About 13 kgs. of a light yellow powder, completely dry to the touch, were obtained which on treating with benzene in an extraction apparatus yield 48% of unsaponifiable matter and 51% of acids in the form of their sodium salts. All percentages are calculated on the starting material.

*Example 2*

15 kgs. of crude Montan wax were treated with 5 kgs. of caustic soda solution (22% NaOH), as described in Example 1. About 16 kgs. of crude Montan wax soap were produced in the form of a hard, dark brown powder which on extraction with acetone yield 23% of unsaponifiable matter and 65% of acids in the form of sodium soaps.

*Example 3*

18.7 kgs. of dehydrated crude wool fat (saponification number 130) were heated in a stirring autoclave at 182° C. for 6 hours at 8 atmospheres with 6.4 kgs. of caustic soda solution (30% NaOH). The content of the autoclave was then blown out into a chamber through a nozzle. About 21 kgs. of a flocculent, brown, crude wool fat soap were produced. On extraction with acetone, this crude soap yielded 33% of unsaponifiable matter and a quantity of wool fat soap, from which 64% of crude fatty acid were split off by means of mineral acid.

I claim:

1. The process which comprises, saponifying wool fat by heating the same with caustic alkali in an autoclave, spraying the hot saponification mixture into a receiver, and extracting the finely divided flocculent powder obtained with acetone.

2. The process which comprises, saponifying wool fat with caustic alkali in an autoclave, spraying the hot saponification mixture into a receiver and passing a stream of hot air through said receiver and extracting the obtained finely divided flocculent powder with an inert organic solvent.

3. The process which comprises, saponifying a wax by heating the same with an alkaline saponifying agent, spraying the hot saponification mixture and extracting the finely divided powder obtained with an inert organic solvent.

4. The process which comprises, saponifying a wax by heating the same with an alkaline saponifying agent, mixing the saponification mixture with a finely divided inert material, spraying the resulting hot mixture into a receiver and extracting the finely divided powder obtained with an inert organic solvent.

5. The process which comprises, saponifying a wax by heating the same with an alkaline saponifying agent, spraying the hot saponification mixture into a receiver while contacting the material with a hot inert gas, and extracting the finely divided powder obtained with an inert organic solvent.

6. The process which comprises saponifying beeswax by heating the same with an alkaline saponifying agent, spraying the hot saponification mixture into a receiver while contacting the material with a hot inert gas, and extracting the finely divided powder obtained with an inert organic solvent.

7. The process which comprises saponifying Montan wax by heating the same with an alkaline saponifying agent, spraying the hot saponification mixture into a receiver while contacting the material with a hot inert gas, and extracting the finely divided powder obtained with an inert organic solvent.

In testimony whereof I have hereunto set my hand.

ERWIN LIESE.